United States Patent [19]
Thomas et al.

[11] Patent Number: 5,317,318
[45] Date of Patent: May 31, 1994

[54] IDENTIFICATION SYSTEM USING TRANSPONDER BADGES, COMPONENT PARTS THEREFOR AND APPLICATIONS THEREOF

[75] Inventors: Gérard Thomas, Eragny S/Oise; Alain Oliveros, Montauban, both of France

[73] Assignee: Alcatel N.V., Amsterdam, Netherlands

[21] Appl. No.: 44,567

[22] Filed: Apr. 7, 1993

Related U.S. Application Data

[63] Continuation of Ser. No. 733,316, Jul. 22, 1991, abandoned.

[30] Foreign Application Priority Data

Jul. 23, 1990 [FR] France ................. 9009380

[51] Int. Cl.[5] ............................................ G01S 13/80
[52] U.S. Cl. ..................................... 342/44; 342/51;
379/56; 379/57; 379/60; 379/62; 379/63
[58] Field of Search ............. 342/42, 44, 51, 45;
379/56, 57, 58, 59, 60, 61, 62, 63, 245

[56] References Cited

U.S. PATENT DOCUMENTS

| | | | |
|---|---|---|---|
| 3,766,552 | 10/1973 | Hajduk | 342/37 |
| 4,047,171 | 9/1977 | Fugit | 342/51 |
| 4,096,477 | 6/1978 | Epstein et al. | 342/44 |
| 4,725,841 | 2/1988 | Nysen et al. | 342/44 |
| 4,734,698 | 3/1988 | Nysen et al. | 342/44 |

Primary Examiner—John B. Sotomayor
Attorney, Agent, or Firm—Robbins, Berliner & Carson

[57] ABSTRACT

A system for identifying persons, animals or objects provided with identifying badges comprises at least one interrogator provided with a microwave transmitter producing interrogation signals modulated by a BARKER code. A plurality of transponder type identifying badges use the power of a BARKER code modulated signal received from an interrogator to transmit a respective microwave response code transposed from the received signal. At least one identification receiver is adapted to decode the microwave response codes from the badges by a correlative method. The system is incorporated into a server application, in particular a multiservice telephone installation processing the identification information that it provides.

7 Claims, 4 Drawing Sheets

IDENTIFICATION SYSTEM USING TRANSPONDER BADGES, COMPONENT PARTS THEREFOR AND APPLICATIONS THEREOF

This is a continuation of Ser. No. 733,316 filed Jul. 22, 1991 now abandoned.

BACKGROUND OF THE INVENTION

1. Field of the Invention

The invention concerns a radio-based system for identifying persons, animals or objects wearing or carrying identifying transponder type badges. It is also concerned with the component parts of a system of this kind, such as a badge interrogator and a receiver processing at least in part the responses provided by the badges, the badge itself and applications of a system of this kind.

2. Description of the Prior Art

The identification of persons, animals or objects by means of badges is conventionally applied directly in entry or transit control and indirectly in presence control.

Each badge has a characteristic that can be recognized by an appropriate identification system, either individually or within a category.

The recognition of the characteristic of a badge by an identifier system implies the use of an information receiver with which the badge is required to communicate.

This communication can be established at the initiative of the badge wearer in some applications, in particular when the wearer requires access. It can also be initiated automatically by the presence of the badge wearer without the latter having to do anything in particular, for example when initiation is triggered by the passage of the badge through an accessway equipped to achieve this.

It is standard practice in microwave communications and in particular in radio direction finding to trigger the transmitter of a transmitter-receiver device by sending a signal to the receiver of the device from an interrogator.

This method can be used with a transmitter-receiver implemented as a badge and relieves the badge wearer of any need to concern himself with setting up a communication link, so that badges can be assigned to "wearers" in whom no responsibility need be placed, such as animals and objects.

The badge must then either incorporate its own power source or receive external power enabling it to transmit to the receiver(s) of the radio identification system.

For technical and economic reasons that are well known in the field of radio communications, transmission by the interrogators and the badges is discontinuous and initiated only when necessary, insofar as this is possible.

One technical reason for minimizing transmission by the badges is that it entails the consumption of power from a supply whose state of depletion and/or deterioration must be checked periodically if the supply is incorporated into the badge.

This constraint is a major drawback in radio identification systems where the badge wearer is often required to assume minimal or even no responsibility with regard to the radio identification equipment.

A second technical reason for minimizing the duration of transmission by the badges is related to congestion and radio frequency interference that could be caused by long and/or simultaneous transmissions, to the detriment of both the radio identification system itself and the general environment.

The duration of transmissions by the badges and the possibility that more than one badge may transmit at a time have a direct influence on the identification capacity of the radio identification system, on the complexity of the identification receiver(s) and on the system in general.

The present invention is therefore concerned with a system for identifying persons, animals or objects provided for this purpose with transponder type identifying badges.

It also concerns the component parts of a system of this kind such as a badge interrogator and a receiver processing at least in part the responses provided by the badges and applications of a system of this kind.

SUMMARY OF THE INVENTION

One aspect of the invention includes a server application comprising a radio identification system comprising at least one interrogator provided with a microwave transmitter producing interrogation signals modulated by a BARKER code, a plurality of transponder type identifying badges using the power of a BARKER code modulated signal received from an interrogator to transmit a respective microwave response code transposed from the received modulated signal, at least one identification receiver adapted to decode microwave response codes received from the badges by a correlative method, said server processing identification information obtained by the radio identification system supplied to it by a control system of said system via a transmission link to its own control system.

The server application preferably comprises a keying system or integrated services digital switching center type telephone installation receiving information provided by the radio identification system to determine in real time the location of at least some telephone subscribers wearing badges served by the installation to provide paging functions and/or to transfer calls addressed to them to the telephone or telephone terminal near which each is located at the time.

The server application is advantageously adapted to transfer specific facilities (for example, customized user prompts, access to restricted data such as private voice mailboxes and access to toll services such as long distance) associated with the category of telephone installation subscriber conventionally assigned to the usual telephone or telephone terminal of said subscriber to the telephone or telephone terminal near which said subscriber is temporarily located on the occasion of a telephone call to or by said subscriber by combining the possibilities of the control units of the radio identification and switching system of the telephone installation.

The invention, its features and its advantages are explained in the following description with reference to the drawings listed below.

DETAILED DESCRIPTION OF THE INVENTION

Figure 1:
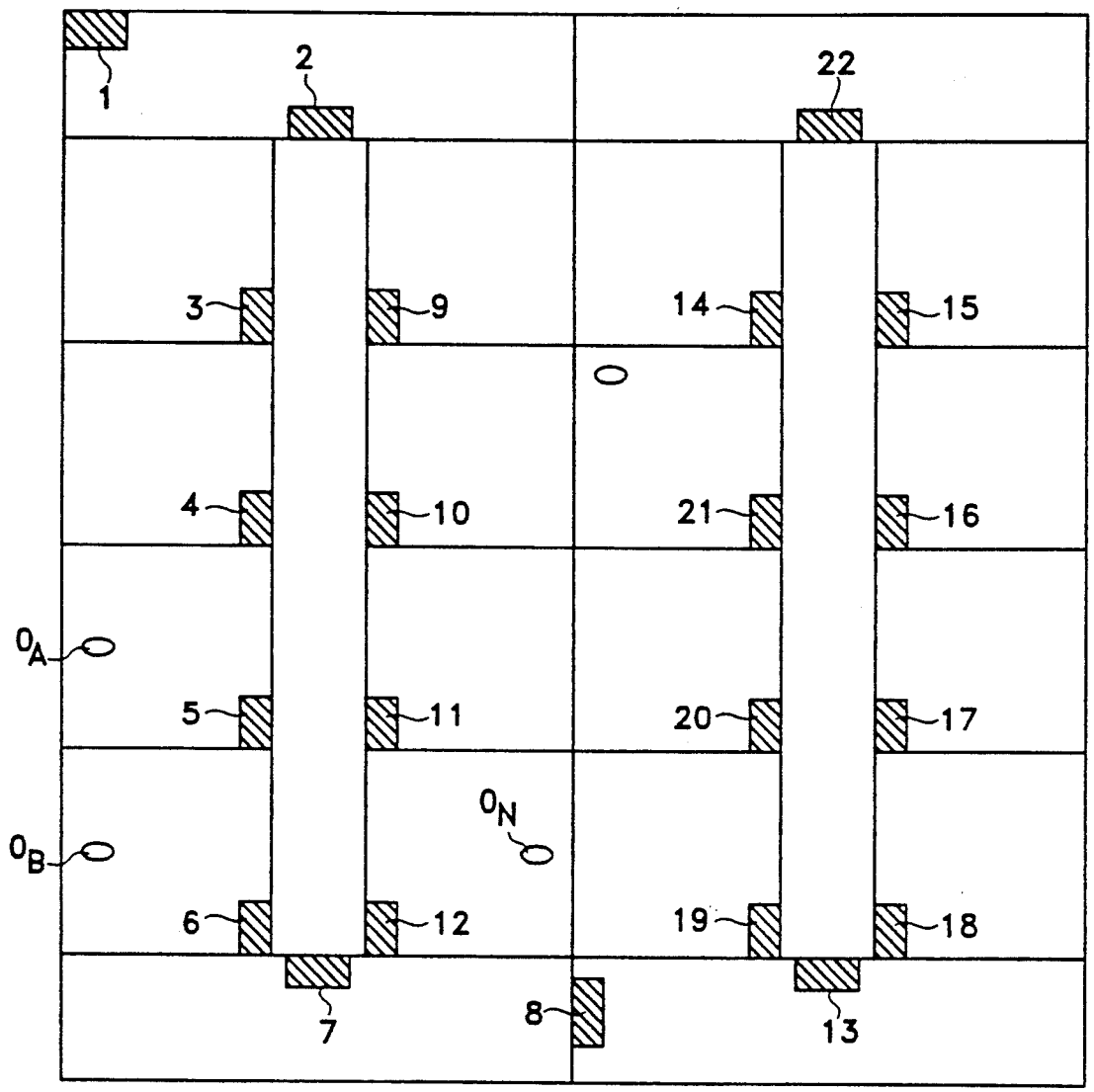
FIG. 1 is a diagram showing one example of an application of a radio identification system in accordance with the invention.

FIG. 1 shows one possible implementation of a radio identification system in accordance with the invention which in this example locates persons, animals or objects wearing or carrying transponder type badges O ($O_A$, $O_B$, $O_N$) which identify them. The diagram shows one floor of an enclosed building comprising a plurality of rooms accessible from the exterior via an entrance 1, a single entrance being shown to simplify the diagram. The entrance leads into a room communicating with a corridor through an entrance 2. The corridor communicates through individual entrances 3 through 7 and 9 through 12 with the same number of rooms each of which has a single entrance, except for the room with the entrance 7 which also communicates with another room through an entrance 8. This other room with the entrance 8 also has an entrance 13 into a second corridor. The second corridor communicates through individual entrances 14 through 22 with the same number of other rooms each with a single entrance.

Figure 2:
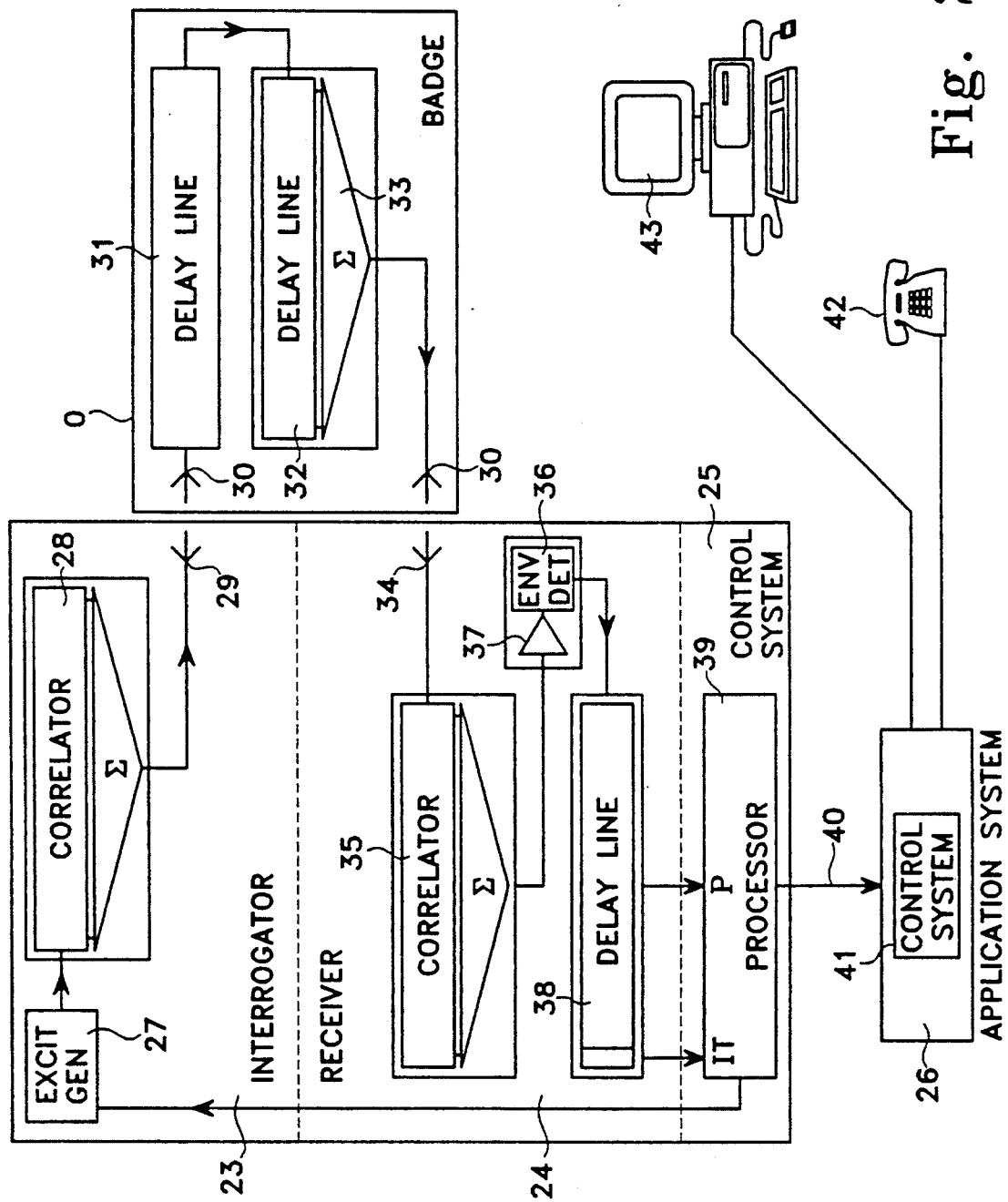
FIG. 2 shows a radio identification system in accordance with the invention.

Each entrance mentioned above is provided with a radio-identifier with the same reference number and which comprises a badge interrogator 21 and an identification receiver 24 (see FIG. 2).

The interrogator 23 includes a microwave transmitter which is commanded to transmit a microwave interrogation code or a plurality of such codes.

The interrogation codes are transmitted to enable identification of transponder type badges which use the energy of a received microwave interrogation code to send an individual microwave response code derived (transposed) from the received interrogation code.

The badges O are conventionally intended to enable the identification of individual persons, animals or objects (or of categories of persons, animals or objects) to which they are assigned and on which they are usually placed.

The microwave receiver 24 of a radio-identifier is adapted to decode the individual microwave response codes transmitted by the badges 0 on receiving an interrogation signal produced by an interrogator 23 in whose field of action they are located.

To prevent complications resulting from the processing of simultaneous responses affecting the radio location system and in particular the identification receivers 24, the possibility of simultaneous responses can be minimized, for example by precisely delimiting the transmit-receive area of a radio-identifier.

In the application shown in FIG. 1 this can easily be achieved by allowing only one badge wearer at a time to pass the radio-identifier, for example by appropriate physical means and by appropriate choice of the interrogator transmit beam and of the effective reception sector of the identification receivers, using techniques known to the man skilled in the art.

A control system 25 based on at least one processor 39 and auxiliary devices such as memories processes badge identification information supplied by one or more radio-identifiers by means that will not be explained further here and which make it possible, for example, to identify a badge wearer when the latter enters the field of action of a radio-identifier and consequently to locate him as he moves around, especially if the wearer enters in succession the areas of action of at least two radio-locators in the application example to which FIG. 1 relates. To this end, the information needed to locate a badge under surveillance is stored, for example in a control unit memory of the radio identification system or of an application system into which the radio identification system is incorporated, after it is obtained from information provided by the radio-identifiers whose field of action the badge has entered.

The use of direction sensing means in association with a radio-identifier also makes it possible to locate a badge wearer at least approximately using a single radio-identifier, if necessary. This can be achieved in various ways, for example by two associated light (e.g. infra red) barriers one on each side of the central part of the area of action of a radio-identifier, the order in which the barriers are crossed being communicated to the control system 25 to enable it to obtain the required location information by a basic method taking account of such crossings. This method will not be described further here. Whichever of the two barriers is crossed last by a badge wearer indicates on which side of said central part the wearer is then located.

In one alternative embodiment the radio-identification system is combined with an application system 26 adapted to process the identification, entry and/or location information for its own purposes, the control system 25 of the system being connected directly or indirectly to a control system 41 based on at least one processor of the application system by at least one transmission link 40 of a usual appropriate type.

The application system 26 is, for example, a keying system or integrated services digital switching center type telecommunication installation receiving information supplied by the radio-identification system in order to monitor in real time the location of at least some of the subscribers to fulfil the functions of conventional paging systems and/or to transfer calls addressed to them to the telephone 42 or telephone terminal 43 near which they are located at the time.

If the subscribers are entitled to specific facilities available to subscribers in their category conventionally assigned to their usual telephone or telephone terminal, the combination of the radio-identification system and a telecommunication installation makes it possible to transfer those facilities automatically to the telephone or telephone terminal near which a subscriber is temporarily located.

These subscriber monitoring and facility transfer processes involve the implementation of procedures usually embodied in the form of software familiar to the man skilled in the telecommunications art and which will not be described in more detail here, being only indirectly related to the present invention.

FIG. 2 shows the composition of the characteristic units of one embodiment of radio-identification system in accordance with the invention.

The interrogator 23 of a radio-identifier of the proposed system essentially comprises a microwave transmitter with a fixed transmit frequency supplied by an excitation generator 27 operating in the surface acoustic wave band, for example at a frequency of around 2 GHz.

The generator 27 drives a correlator 28 based on a comb filter implemented in the form of a surface acoustic wave device.

The correlator 28 is implemented in a known way to produce an encoded signal which, according to the invention, is preferably a BARKER code with 13 elements of value +1 or −1, this code representing the sequence 11111-1-111-11-11.

A unity value correlation peak can therefore be obtained for a level of 1/13 when detected by a transversal filter whose coefficients match the above sequence.

Phase modulation (0° or 180°) with raised cosine overmodulation enables the spectrum to be limited to conform with the applicable standards.

The phase shifts are applied when the signal has a null value.

The signal appearing at the transmit antenna 29 to which the correlator 28 is connected is in the form of a high-frequency sinusoid amplitude modulated as explained above and the envelope of which comprises 13 modulation periods in each transmission. Transmission is timed according to the size of the badge address field and the selected modulation rate. It is possible to obtain very short transmission times, in the order of one microsecond, for example, during which the badge is interrogated by the transmitter of the interrogator.

The badges O are identical and each comprises a credit card type support incorporating a microwave antenna 30, for example an appropriate shape conductive area printed onto the support, for receiving interrogation codes as described above and for transmitting an individual identification code.

They also include a surface acoustic wave device comprising two delay lines 31 and 32 in series, the first acting as a buffer for the second which serves as an individual badge address encoder.

The buffer delay line 31 is connected to the antenna 30 of the badge. Its function is to delay transmission to the second delay line of microwave signals received by the badge for a time at least equal to the time for an interrogator 23 to transmit the excitation profile which constitutes a BARKER interrogation code.

The delay line 32 serves as a transmit encoder. It is of the constant pitch comb filter type and has outputs which are connected or not to the antenna 30 of the badge via a common summing device 33 in a specific way representative of the address of the badge O; the combination of the delay line 32 and these connections defines a structure comparable to that of the correlator 28, although having a different function (summing rather than correlation).

The filter pitch is selected to be at least equal to the bit time used for generating the excitation profile by the identifier 23.

Figure 3:
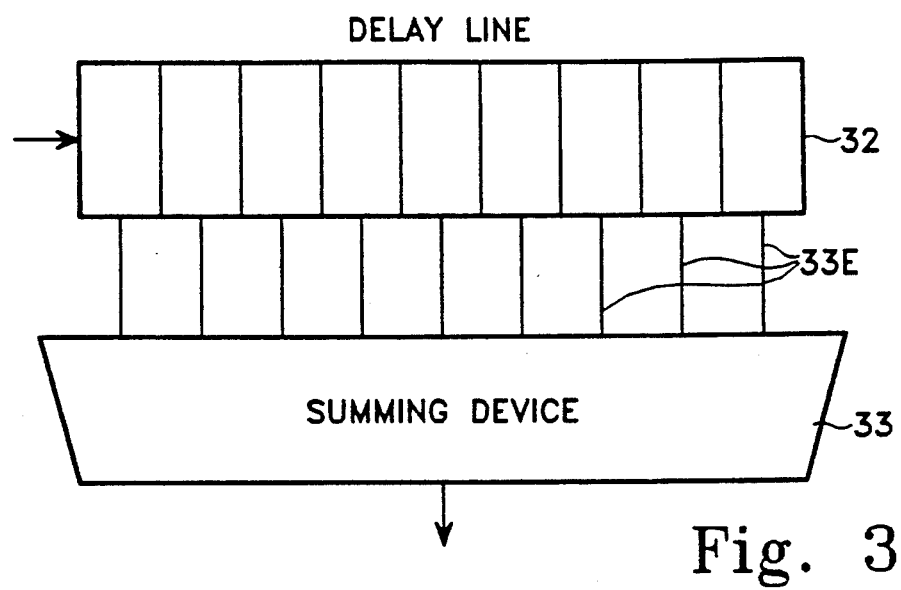
FIG. 3 is a diagram showing how the address of a badge is wired.

FIG. 3 shows that to facilitate reading the address of each badge the extreme positions of the outputs of the line 32 serving as an encoder are used as start and stop bits, the intermediate electrodes serving for addressing bits proper. This is symbolically represented by the presence or absence of connections 33E between the outputs and the common summing device 33, the address shown representing the binary code 1010111 preceded by a start bit and followed by a stop bit each with the value 1.

After receiving an interrogation BARKER code, a badge transmits for the time needed for the corresponding interrogation code to pass along the delay line 32 a microwave signal which at each meaningful bit time represents the sum of the signals then present at all the electrodes of the delay line 32 which are connected to the summing device 33 of the badge in question.

The identification microwave signal retransmitted by a badge illuminated by an interrogator 23 is picked up by the identification receiver 24 associated with the interrogator. To enable this the identification receiver 24 includes a receive antenna 34 which may be combined with the transmit antenna 29 and which is connected to one input of a correlator 35 identical to the correlator 28 of the interrogator 23.

The correlator 35 drives an envelope detector circuit 36 via an amplifier 37 and the envelope detector is connected to the input of a delay line 38 forming a register for the control system 25 of the radio-identifier concerned.

Figure 4:
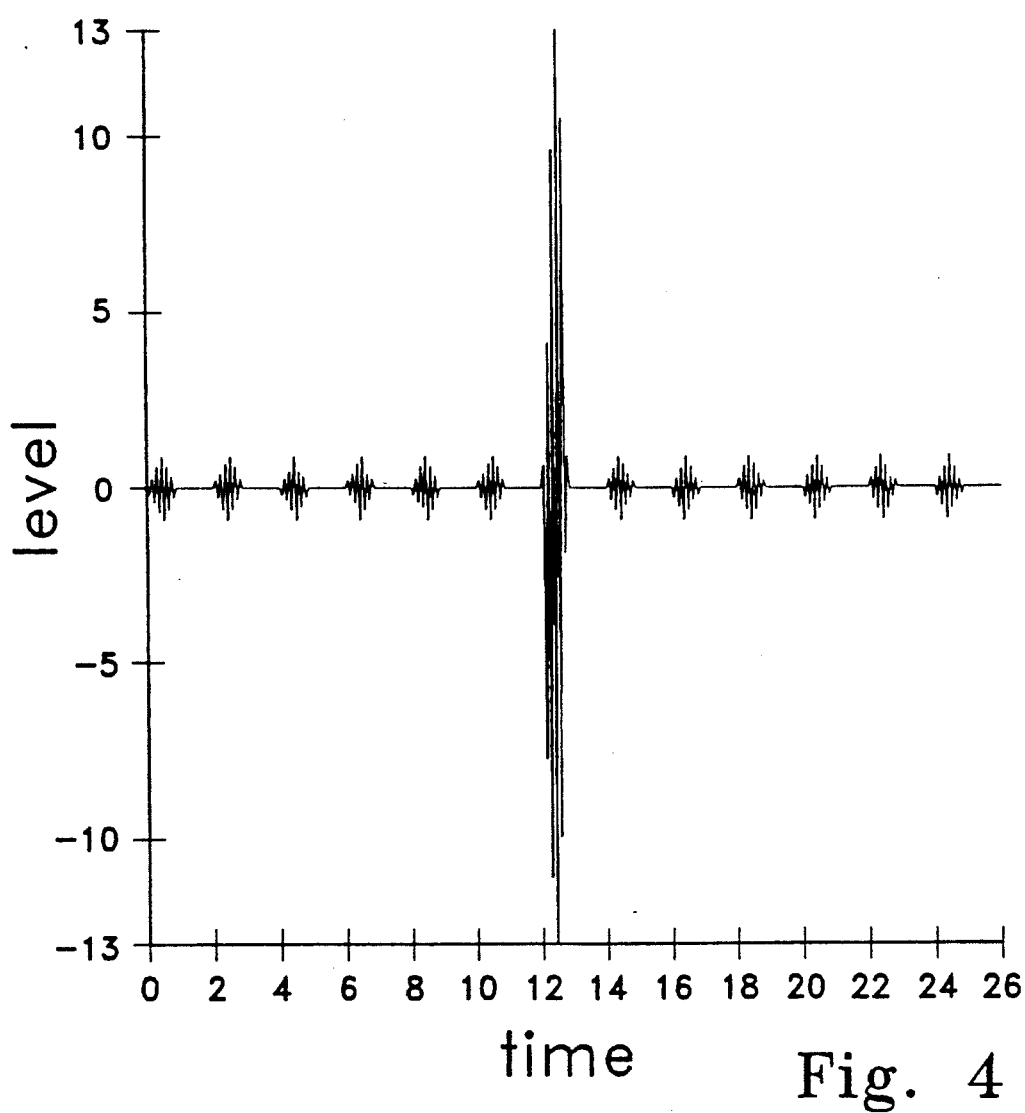
FIG. 4 is a graph showing as a function of time the amplitude of the output signal of a correlator of an identification receiver following an interrogation and in the absence of any response from a badge.

If there is no badge able to respond when an interrogation code is transmitted by the interrogator 23 the signal received by the identification receiver 24 produces an amplitude modulated signal at the output of the correlator 35 of the form shown in FIG. 4.

This signal has a peak at the center representing the signal obtained when the interrogation code has been entirely received and is entirely contained within the successive elements of the delay line included in the correlator 35, the lower signal levels before and after this peak being produced if the bits of the code are not or are no longer correctly positioned in the correlator 35.

Figure 5:
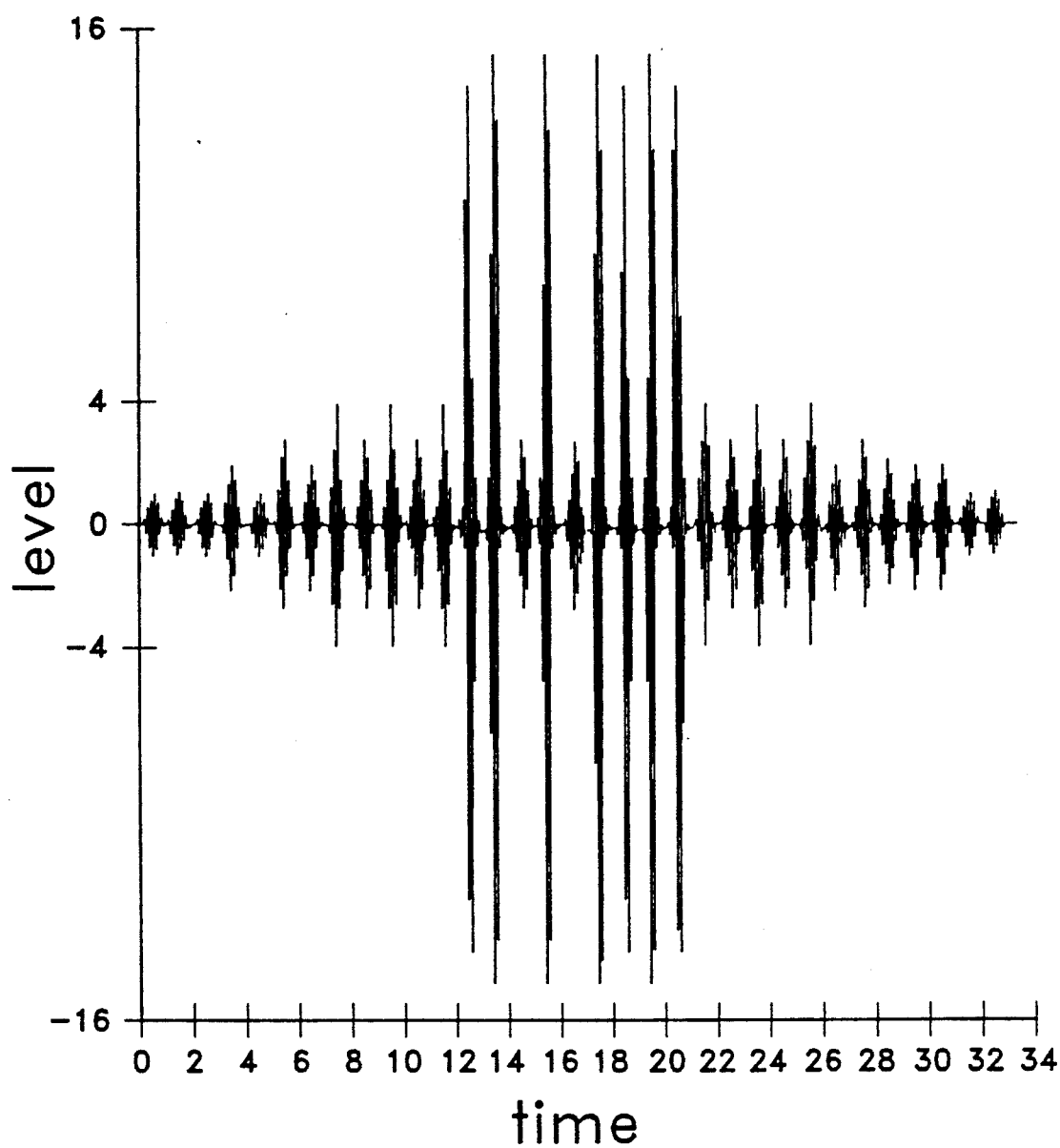
FIG. 5 is a graph showing as a function of time the amplitude of the output signal of a correlator of an identification receiver following an interrogation which secures a response from a badge.

The identification microwave signal picked up by an identification receiver 24 from a badge illuminated by the interrogator associated with said receiver produces at the output of the correlator 35 a signal shown in FIG. 5.

This signal initially comprises a succession of low-amplitude components representing the elements of the microwave signal produced by the badge before the first correlation is determined. This produces a first amplitude peak at the output of the correlator 35 and represents the action of the first address connection of the delay line 32 serving as the transponder badge encoder.

The subsequent amplitude peaks of the output signal from the output correlator 35, representing other correlations, are due to the individual and successive actions of the other address connections along the delay line 32 of the badge in question.

The address of the badge which transmitted the signal received by the correlator 35 as revealed by the correlator 35 is then temporarily stored in the delay line 38 for processing by the processor 39 to a port P of which the outputs of the delay line 38 are connected, the start bit received first being processed to initiate, for example, an interrupt IT to the processor 39 when the address is entirely stored.

What is claimed is:

1. A server-based system comprising
    a telephone installation having a switching system to which is connected a plurality of telephones and/or telephone terminals,
    a radio identification server subsystem further comprising
    at least one interrogator including a microwave transmitter for producing interrogation signals modulated by a BARKER code,
    a plurality of transponder type identifying badges using the power of a BARKER code modulated signal received from one of said interrogators to transmit a respective microwave response code transposed from the received modulated signal, at least one identification receiver for using a correlative method to decode the microwave response codes received from the badges, an identification control system responsive to decoded microwave response codes for deriving identification information, and means for determining in real time the location of at least some telephone subscribers wearing badges served by the installation, a transmission link, and an application subsystem associated with said switching system and connected by said transmission link to said radio identification server subsystem, for using the location information obtained by the radio identification server in an on-line data processing application, said application subsystem further comprising contact means for causing said switching system to page each of the subscribers at, and/or for transferring calls addressed to each of the subscribers to, an available telephone or telephone terminal near which each said subscriber is temporarily located, and transfer means for causing said switching system to transfer specific facilities associated with the category of telephone installation subscriber assigned to a usual telephone or telephone terminal of said subscriber, to said available telephone or telephone terminal.

2. Server-based system according to claim 1 wherein said interrogator further comprises a fixed frequency generator, and a correlator in the form of a surface acoustic wave comb filter responsive to the output of the fixed frequency generator for repetitively producing the same BARKER code modulated signal, and an antenna for transmitting the BARKER code modulated signal to the identifying badges.

3. Server-based system according to claim 1 wherein each of said transponder badges further comprises a microwave transmit and receive antenna carried by the badge, a summing device, said summing device having an output connected to the antenna to transmit an encoded microwave signal representative of the badge using the power transmitted by a particular microwave interrogation signal modulated by a BARKER code if a signal of this kind is picked up by the antenna, a constant pitch comb filter type first delay line having an input connected to the microwave transmit and receive antenna and having outputs selectively connected to the summing device to define an address for the badge, and a second delay line providing a buffer between the antenna of the badge and the input of the first delay line, to delay transmission by the badge on receiving an interrogation code by a time at least equal to the time required to transmit an interrogation code.

4. Server-based system according to claim 3 wherein each badge is of the credit card type, said microwave transmit and receive antenna is formed by a conductive area on the card, and both said delay lines are surface acoustic wave delay lines.

5. Server-based system according to claim 1 wherein each said interrogator and each said identification receiver further comprise respective BARKER code correlators in the form of surface acoustic wave comb filters and each of said badges further comprises a transmit encoder using a delay line of the same design as said correlators.

6. Server-based system according to claim 1 wherein said telephone installation comprises an internal communication system for communications between said plurality of telephones and/or telephone terminals.

7. Server-based system according to claim 1 wherein said telephone installation comprises an integrated services digital switching center.

* * * * *